Patented Mar. 14, 1950

2,500,858

UNITED STATES PATENT OFFICE 2,500,858

RUBBER COMPOSITION AND METHOD OF PRODUCING

Clifford B. Pape, Montague, Mich., and John Richard Sweetman, Butler, Pa., assignors to Valley Industries, Inc., New York, N. Y., a corporation of New York No Drawing. Application June 5, 1947,
Serial No. 752,822

8 Claims. (Cl. 260—752)

1

The present invention relates to improvements in material to be employed in the processing and compounding of rubber, synthetic and natural as well as reclaims, in order to facilitate such processing and compounding and to improve the physical properties of the resultant rubber products, as well as to the improved rubber products containing such material.

Hereinafter, the term "rubber" is used in its generic sense to cover natural and synthetic rubber as well as reclaims.

It is an object of the invention to provide a material which when added to rubber will reduce its tackiness and thereby prevent batches thereof from sticking on rubber mills and calenders during compounding and processing.

It is a further object to provide a material which when added to rubber during its compounding and processing will decrease the time required for mixing fillers and other additives with the rubber batches.

Another object of the invention is to provide a material which when incorporated with rubber will improve its physical properties, such as tensile strength, elongation, tear resistance, abrasion resistance.

Still another object is to provide a material which will improve the molding characteristics of rubber in which it has been incorporated.

Another object of the invention is to provide an improved method of processing and compounding rubber with the aid of such materials whereby such processing and compounding is facilitated and the properties of the rubber produced are improved.

The sticking of tacky rubber batches to the rolls of mills and calenders has been a great problem to the rubber industry for many years, as it not only holds up production but also causes the loss of many hours of the operators' time. Also, the mixing time required in the compounding of rubber batches has in many instances been exceedingly long so that output obtained per mixing mill is low.

In accordance with the present invention, it has been discovered that the addition of a soapy waxy material, obtained by causing oxidation and polymerization of an unsaturated fatty acid of the type of oleic acid (namely, a higher fatty acid containing one double bond) in admixture with a sulfonated oil and a metallic oxide to a rubber batch during compounding and processing, will not only reduce its tendency to stick to the mill or calender, but also aids in its processing and improves the physical properties of the resultant rubber product.

Preferably, the soapy waxy material is produced by heating an unsaturated fatty acid, such as oleic acid, in the presence of a sulfonated vegetable oil and adding a metallic oxide which accelerates the polymerization and oxidation of the oleic acid. It is not necessary to employ heat to effect the desired oxidation and polymerization, as such mixture will undergo oxidation and polymerization at room temperature, but the period of time required therefor is too long for practical purposes.

It has been found that sulfonated castor oil and sulfonated peanut oil are preferable for the composition in accordance with the invention, but other sulfonated oils also give suitable results.

The metallic oxides employed are those which accelerate the polymerization and oxidation of oils, such as calcium oxide, zinc oxide, cobalt oxide, lead oxide and the like. Zinc oxide and calcium oxide are preferred, but in many instances the use of zinc oxide is desirable as it does not act as an accelerator in rubber. Zinc and calcium are both in the third period of the second group of the periodic system.

The proportion of sulfonated oils to fatty acid in the composition may be varied considerably in order to obtain a product most suited for the particular rubber product heated; generally, however, proportions of 1:3 to 1:1 have been found most suitable. Increasing the quantity of sulfonated oil in the composition renders the rubber stock processed smoother and lessens its tack.

The proportion of metal oxide to the sulfonated oil and fatty acid may vary between about 9% and 40%. Preferably, however, proportions approximating the stoichiometric proportion are employed. For example, in preparing a composition containing 30 parts sulfonated castor oil and 70 parts oleic acid, 13% of zinc oxide has been found to give excellent results. The stoichiometric proportion would be twelve and a fraction per cent. While larger proportions of the metallic oxide tend to accelerate the desired polymerization and oxidation, it is sometimes found that the excess of the oxide remains in small lumps in the resultant soapy waxy material.

The oxidation and polymerization reaction is preferably carried out by stirring the admixture of the sulfonated oil, fatty acid and metallic oxide while heating to 140° F. to 285° F. until the product when cool is a solid soapy waxy material. The oxidation may be facilitated with the use of oxidizing agents, such as peroxides and ammonium persulfate, or by passing oxygen or ozone through the mixture. Also, oxidizing catalysts, such as nickel and aluminum may be used. These additional oxidizing measures are, however, not necessary.

The following examples are illustrative of the invention:

Example I

Thirty (30) parts of sulfonated castor oil and seventy (70) parts of oleic acid are stirred together in a jacketed vessel heated with steam. When the temperature of the mixture reaches 140° F., thirteen (13) parts of zinc oxide are added and the mixture thoroughly stirred while it is heated slowly until it reaches a temperature of 230° F. The resultant product is then poured into suitable containers, such as tin buckets or paper cartons, and when cooled to room temperature, it assumes a soapy waxy consistency.

The addition of this product to rubber during its compounding and processing will prevent even the tackiest rubber batches from sticking to the rolls in the mill or calender. When the rubber containing such addition is cured, the tensile strength and elongation are improved.

The addition of such material smoothens out rubber stocks and aids the processing. It furthermore improves tubing and molding as uniform flow of the rubber is improved. Also, in molding defectives are cut in some instances by more than 90% by the addition as the molded products are more easily freed from the molds and as tear resistance is improved.

In combining this material with natural and reclaimed rubber, 2% to 3% have been found most suitable. In synthetic rubber higher proportions of, for example, 5% to 15% have been found most suitable.

Example II

A mixture of twenty-five (25) parts sulfonated castor oil, seventy-five (75) parts oleic acid and thirteen (13) parts zinc oxide are heated in an open vessel to 230° F. to 234° F. After stirring to promote oxidation, it is poured out and permitted to cool. A soapy waxy material results, which when added in proportion of 2% to 3% reduces the tack of reclaims on a rubber mill.

Example III

A mixture of fifty (50) parts sulfonated castor oil, fifty (50) parts oleic acid and thirteen (13) parts zinc oxide is heated to 248° F. and stirred. Upon cooling a harder and whiter material than that of Example II results. When incorporated with rubber reclaims, it produces much smoother stock which is less tacky than when the material of Example II is used because of the higher percentage of sulfonated castor oil.

Example IV

A mixture of twenty-five (25) parts sulfonated peanut oil and seventy-five (75) parts oleic acid are heated to 140° F. and fifteen (15) parts of zinc oxide added. The mixture is then stirred with a mixer and heated slowly to 260° F. This product upon cooling is similar to those of the previous examples, but the tensile strength of the cured rubber products is not quite as high as when sulfonated castor oil is used in the preparation.

Example V

A mixture of thirty (30) parts sulfonated peanut oil and seventy (70) parts oleic acid is heated to 140° F. and thirteen (13) parts of zinc oxide added. The mixture is heated to 240° F. and held at that temperature for ten minutes while stirring, and then cooled. The product is similar to that of Example IV, but when used in reclaims it produces a better modulus.

Example VI

A mixture of thirty (30) parts sulfonated castor oil, seventy (70) parts oleic acid and thirteen (13) parts lime are heated and stirred to effect polymerization and oxidation. A soapy waxy material having properties similar to those of the previous examples is obtained.

Example VII

A mixture of thirty (30) parts sulfonated castor oil, seventy (70) parts oleic acid and twenty (20) parts lead oxide is heated while stirring for several weeks at 176° F. to produce a soapy material. At room temperature, such mixture will oxidize and polymerize into the same product over a period of months. The addition of this product to rubber will hasten the cure.

Other materials which may be necessary for the compounding of the rubber composition desired may be added to the composition, in accordance with the invention, during its preparation. In many instances, the incorporation of such additions in the compositions facilitates their addition and dispersion in the rubber composition. The following examples will serve to illustrate compositions in accordance with the invention containing such additions:

Example VIII

A mixture of thirty (30) parts sulfonated castor oil, seventy (70) parts oleic acid and ten (10) parts stearic acid is prepared. After the addition of 15% of lime to this mixture, it is heated to 240° F. while stirring. This product possesses all of tack reducing and improved processing properties of the products of the previous examples. In addition, the incorporation of stearic acid makes it unnecessary to add stearic acid to natural rubber stocks to obtain a good cure. Higher percentages of stearic acid may also be used.

Example IX

A mixture of thirty (30) parts sulfonated castor oil, seventy (70) parts oleic acid and ten (10) parts mineral oil are prepared. To this 15% of lime is added and the mixture stirred and slowly heated until 240° F. is reached. While the products of the other examples effect softening of natural and reclaimed rubber and all synthetics except polychloroprene, the product of this example which contains mineral oil also effects a softening of polychloroprene. Higher percentages of mineral oil may also be incorporated to produce a greater softening effect on polychloroprene.

Example X

A mixture of eighteen (18) parts sulfonated castor oil, twenty-eight (28) parts oleic acid and one hundred (100) parts carbon black is heated to 140° F. and 15% of lime calculated on the sulfonated oil and oleic acid are added. The mixture is then stirred and slowly heated to 240° F. The resultant product makes it possible to add carbon black to rubber and obtain good dispersion thereof on a mill without flying around.

Even larger quantities of carbon black can be incorporated in the material.

Example XI

A mixture of thirty (30) parts sulfonated castor oil, seventy (70) parts oleic acid, thirteen (13) parts lime and five (5) parts titanium oxide (or other coloring material) is heated and mixed until a soapy waxy material is obtained upon cooling. The addition of this product to rubber provides excellent dispersion of the coloring matter in the rubber. In the same manner, it is also possible to incorporate other types of materials, such as accelerators and anti-oxidants, with the composition to provide better dispersion of such materials in rubber.

The soapy waxy material, which is obtained in accordance with the invention, possesses many advantageous properties when admixed with rubber. The actual proportions used vary with the end sought and the type of rubber composition to which it is added. In general, smaller quantities are required in natural and reclaimed rubber compositions than in synthetic rubber compositions. In natural rubber and reclaims 2% to 3% have been found suitable for most purposes. In synthetic rubber proportions up to 15%, preferably 5% to 15% have been found suitable.

The addition of the soapy waxy material to rubber compositions will reduce the tack to iron and steel and improve processing as well as improve the physical properties, such as tensile strength, elongation, and abrasion and tear resistance, in the cured products.

The rubber compositions containing the soapy waxy material possess improved molding properties. Not only is their flow into the mold improved, but their adhesion to the mold is decreased so that coating of the molds with dopes, such as soaps, can be omitted in most instances.

The addition of the soapy waxy material to rubber compositions assists in preventing burning and scorching at processing temperatures.

In processing reclaims, the addition of the soapy waxy material causes lumps to break down and smooth out rapidly during the processing.

Scorched or burned polychloroprene batches can be reused by incorporating 8% to 10% of the soapy waxy product. After mixing, the polychloroprene smooths out, and upon curing, good physicals result.

Polychloroprene containing compositions to prevent setting up during processing, such as acetates, are given a better safety factor when the soapy waxy material is added.

Natural rubber which has had a short cure, such as a fire hose, may be reprocessed with the aid of the soapy waxy material. In the case of fire hose, it is merely necessary to strip the fabric and place the rubber on a mill with 8% to 10% of the soapy waxy material. The rubber smooths out and can be recured without adding further accelerators or sulfur.

The compatibility of GRS, a copolymer of butadiene and styrene, and reclaims is improved by the addition of the soapy waxy material.

The adhesion of a rubber composition to itself, brass or a cement, such as chlorinated rubber, is improved by the addition of a soapy waxy material prepared in accordance with the invention. On the other hand, adhesion to iron and steel is decreased. It is this latter property which permits easier processing of rubber compositions containing the soapy waxy material as the adhesion to the iron or steel rolls of the mill or calender is reduced.

The mixing time required for preparing rubber batches is also materially reduced by the addition of the soapy waxy material. The fillers and other additives are absorbed and dispersed much more rapidly. For example, the mixing time for batches prepared from polychloroprene or from copolymer of butadiene and acrylonitrile can be reduced from about 40 to 45 minutes to 10 to 20 minutes by the addition of 10% to 15% of the soapy waxy material.

We claim:

1. A method of producing a soapy waxy material which comprises heating in an open vessel a mixture of oleic acid, sulfonated castor oil and zinc oxide to a temperature between 140° F. and 285° F. until the resultant product when cool assumes a soapy waxy consistency the proportion of the oleic acid to the sulfonated castor oil being between 1:1 and 1:3 and the quantity of the zinc oxide being between 9% and 40% of the oleic acid and sulfonated castor oil.

2. A method of producing a soapy waxy material which comprises heating in an open vessel a mixture of oleic acid, a sulfonated vegetable oil and an oxide of a metal of the third period of the second group of the periodic system to a temperature between 140° F. and 285° F. until the resultant product when cool assumes a soapy waxy consistency, the proportion of oleic acid to sulfonated oil being between 1:1 and 3:1 and the proportion of metal oxide being between 9% and 40% of the oleic acid and sulfonated oil.

3. A rubber composition containing 2% to 15% of a soapy waxy material obtained by oxidizing and polymerizing oleic acid in admixture with a sulfonated vegetable oil and an oxide of a metal of the third period of the second group of the periodic system, the proportion of the oleic acid to sulfonated vegetable oil being between 1:1 and 1:3 and the quantity of metal oxide being between 9% and 40% of the oleic acid and sulfonated vegetable oil.

4. A rubber composition containing 2% to 15% of a soapy waxy material obtained by oxidizing and polymerizing oleic acid in admixture with sulfonated castor oil and zinc oxide, the proportion of oleic acid to sulfonated oil being between 1:1 and 3:1 and the proportion of zinc oxide being between 9% and 40% of the oleic acid and sulfonated oil.

5. In a method of processing rubber the step which comprises incorporating with a rubber batch 2% to 15% of a soapy waxy material obtained by oxidizing and polymerizing oleic acid in admixture with a sulfonated vegetable oil and an oxide of a metal of the third period of the second group of the periodic system, the proportion of the oleic acid to sulfonated vegetable oil being between 1:1 and 1:3 and the quantity of metal oxide being between 9% and 40% of the oleic acid and sulfonated vegetable oil.

6. In a method of processing rubber the step which comprises incorporating with a rubber batch 2% to 15% of a soapy waxy material obtained by oxidizing and polymerizing oleic acid in admixture with sulfonated castor oil and zinc oxide, the proportion of oleic acid to sulfonated oil being between 1:1 and 3:1 and the proportion of zinc oxide being between 9% and 40% of the oleic acid and sulfonated oil.

7. A method of reducing the tack of a tacky rubber batch to iron and steel which comprises incorporating with such batch 2% to 15% of a soapy waxy material obtained by oxidizing and polymerizing an unsaturated higher fatty acid containing one double bond in admixture with a sulfonated oil and a metallic oxide having the property of accelerating such oxidation and polymerization, the proportion of the unsaturated higher fatty acid to sulfonated oil being between 1:1 and 1:3 and the quantity of metal oxide being between 9% and 40% of the unsaturated higher fatty acid and sulfonated vegetable oil.

8. A method of reducing the tack of a tacky rubber batch to iron and steel which comprises incorporating with such batch 2% to 15% of a soapy waxy material obtained by oxidizing and polymerizing oleic acid in admixture with sulfonated castor oil and zinc oxide, the proportion of oleic acid to sulfonated oil being between 1:1 and 3:1 and the proportion of zinc oxide being between 9% and 40% of the oleic acid and sulfonated oil.

CLIFFORD B. PAPE.
JOHN RICHARD SWEETMAN.

REFERENCES CITED

The following references are of record in the file of this patent:

UNITED STATES PATENTS

| Number | Name | Date |
|---|---|---|
| 1,705,273 | Teague | Mar. 12, 1929 |
| 1,769,717 | Shippard | July 1, 1930 |
| 2,349,165 | Grant | May 16, 1944 |
| 2,388,618 | Omansky | Nov. 6, 1945 |